US010996942B1

(12) United States Patent
Bisa et al.

(10) Patent No.: US 10,996,942 B1
(45) Date of Patent: May 4, 2021

(54) SYSTEM AND METHOD FOR GRAPHICS PROCESSING UNIT FIRMWARE UPDATES

(71) Applicant: DELL PRODUCTS, LP, Round Rock, TX (US)

(72) Inventors: Rama Bisa, Bangalore (IN); Pavan Gavvala, Bangalore (IN); Chitrak Gupta, Bangalore (IN); Rajeshkumar Patel, Bangalore (IN); Akkiah Maddukuri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/748,037

(22) Filed: Jan. 21, 2020

(51) Int. Cl.
G06F 8/65 (2018.01)
G06F 9/48 (2006.01)
G06T 1/20 (2006.01)
G06F 9/4401 (2018.01)

(52) U.S. Cl.
CPC .............. G06F 8/66 (2013.01); G06F 9/4401 (2013.01); G06F 9/485 (2013.01); G06F 9/4812 (2013.01); G06T 1/20 (2013.01)

(58) Field of Classification Search
None
See application file for complete search history.

(56) References Cited

U.S. PATENT DOCUMENTS

| 8,108,879 | B1 | 1/2012 | Garlick et al. |
| 9,292,414 | B2 | 3/2016 | Kiel et al. |
| 2016/0323148 | A1* | 11/2016 | Butcher ................. H04L 41/04 |
| 2018/0342039 | A1* | 11/2018 | Kachare ............. G06F 15/7896 |
| 2019/0042752 | A1* | 2/2019 | Mihm .................... G06F 21/572 |
| 2019/0227616 | A1* | 7/2019 | Jenne .................... G06F 9/4401 |
| 2020/0218527 | A1* | 7/2020 | Ganesan ............. G06F 13/1668 |

* cited by examiner

Primary Examiner — Qing Chen
(74) Attorney, Agent, or Firm — Larson Newman, LLP

(57) ABSTRACT

An information handling system includes a processor, a graphics processing unit (GPU) including an interrupt interface coupled to the processor, and a low-speed interface, and a baseboard management controller (BMC) coupled to the low-speed interface. The GPU is configured to receive a first command from the BMC via the low-speed interface to halt processing data, to send a first interrupt to the processor via the interrupt interface in response to receiving the first command, to determine that the processor has halted sending data to the first GPU in response to the first interrupt, and to send a first reply to the command in response to determining that the processor has halted sending data. The BMC is configured to reboot the first GPU without rebooting the processor in response to receiving the first reply.

17 Claims, 3 Drawing Sheets

SYSTEM AND METHOD FOR GRAPHICS PROCESSING UNIT FIRMWARE UPDATES

FIELD OF THE DISCLOSURE

This disclosure generally relates to information handling systems, and more particularly relates to graphics processing unit management firmware updates in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a processor, a graphics processing unit (GPU) including an interrupt interface coupled to the processor, and a low-speed interface, and a baseboard management controller (BMC) coupled to the low-speed interface. The GPU may be configured to receive a first command from the BMC via the low-speed interface to halt processing data, to send a first interrupt to the processor via the interrupt interface in response to receiving the first command, to determine that the processor has halted sending data to the first GPU in response to the first interrupt, and to send a first reply to the command in response to determining that the processor has halted sending data. The BMC may be configured to reboot the first GPU without rebooting the processor in response to receiving the first reply

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
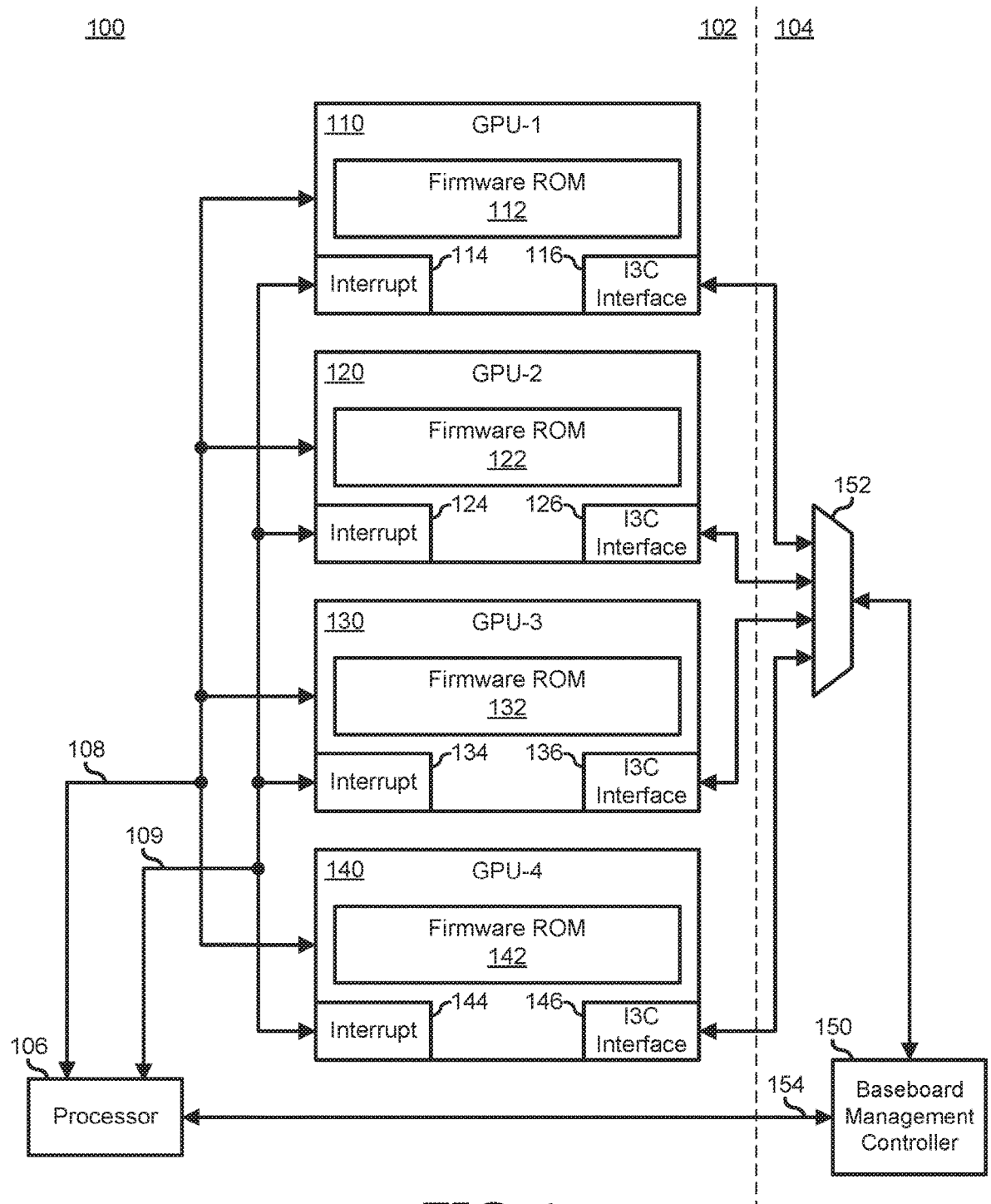
FIG. 1 is a block diagram illustrating an information handling system according to an embodiment of the present disclosure.

FIG. 1 illustrates an information handling system 100, including a host processing system 102 and a management system 104. Host processing system 102 represents hardware, firmware, and software components that are typically associated with a computer or other information handing system, and includes a processor 106 and graphics processing units (GPUs) 110, 120, 130, and 140. Host processor 106 represents one or more central processing units (CPUs), processor cores, or other processing devices. Host processor 106 will be understood to also represent other devices typical of an information handling system such as information handling system 100, and that are utilized to perform the processing tasks of the information handling system, such as initializing and configuring the information handling system under a basic input/output system (BIOS) or a Universal Extensible Firmware Interface (UEFI), loading and executing an operating system (OS), and loading and executing applications programs, software, utilities, and the like. As such, host processor 106 will be understood to include memory devices such as read-only memory (ROM) devices, random access memory (RAM) devices, FLASH memory devices, and the like, data storage devices such as disk drives, solid-state drives (SSDs), and the like, input/output (I/O) devices such as network interface devices, storage interface devices, and the like, human interface devices such as a keyboard, a mouse, a display device, and the like. Host processor 106 is connected to GPUs 110, 120, 130, and 140 via one or more high-speed data links 108, such as by Peripheral Component Interconnect-Express (PCIe) links. Host processor 106 is also connected to receive interrupts from GPUs 110, 120, 130, and 140 via an interrupt interface 109.

GPUs 110, 120, 130, and 140 represent processing resources of information handling system 100 that can be utilized to offload host processor 106 from various functions as needed or desired. As such, GPUs 110, 120, 130, and 140 may be utilized to accelerate applications running on host processor 106 by offloading compute-intensive and time consuming tasks from the host processor. In particular, GPUs 110, 120, 130, and 140 typically perform parallel processing tasks on data much faster than similar code-based operations performed by host processor 106. GPU 110 includes a firmware read-only memory (ROM) 112, an interrupt interface 114 connected to processor 106, and an I3C interface 116 connected to multiplexor 152. GPU 120 includes a firmware ROM 122, an interrupt interface 124 connected to processor 106, and an I3C interface 126 connected to multiplexor 152. GPU 130 includes a firmware ROM 132, an interrupt interface 134 connected to processor 106, and an I3C interface 136 connected to multiplexor 152. GPU 140 includes a firmware ROM 142, an interrupt interface 144 connected to processor 106, and an I3C interface 146 connected to multiplexor 152. Firmware ROMs 112, 122, 132, and 142 will be described below.

Management system 104 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide a management environment for information handling system 100. Management system 104 includes a BMC 150 and an I3C multiplexor 152, and is connected to various components of host processing system 102 via various internal communication interfaces, represented here as an interface 154, to provide an out-of-band (OOB) mechanism to retrieve information related to the operation of the host environment, to provide BIOS/UEFI or system firmware updates, to manage non-processing components of information handling system 100, such as system cooling fans and power supplies. For example, interface 154 may include a Low Pin Count (LPC) interface, an Inter-Integrated-Circuit (I2C) interface, an I3C interface, a PCIe interface, or the like. An example of BMC 150 may include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management system 104 may include additional memory devices, logic devices, security devices, or the like, as needed or desired.

Because the use of GPUs has historically been associated with high-end graphics applications, such as for high-performance gaming systems, workstations, and the like, the usage models for GPUs have not typically been adapted to the enterprise environments, such as in data center servers, high-performance computing systems, or the like. In particular, the manageability of GPUs has typically been associated with interactions via the host system, because reboots to implement various changes, such as firmware updates and the like, may typically be scheduled for times when the host system is not otherwise being utilized, such as when no user is present. However, such usage models present challenges for the enterprise environment where host processing resources are reserved for more profitable application processing, and where reboots may disrupt not only processes that are running on a particular GPU, but also disrupts other processes running on the information handling system, particularly where the information handling system is operating a highly virtualized processing environment. In particular, in a typical enterprise system that utilizes GPUs, an in-band agent, such as a GPU driver or firmware update utility, may operate to upload a firmware update to one or more GPUs on an enterprise system, and then initiate a reboot of the whole enterprise system to implement the updated firmware on the selected GPUs. Here further, updating multiple GPUs may involve multiple reboots of the enterprise system to update all GPUs in the enterprise system, particularly when multiple different types of GPUs are installed in the enterprise system. Even where an enterprise system utilizes a BMC, the BMC may operate to upload the firmware updates to all GPUs in the enterprise system, and then reboot the whole enterprise system to implement the updated firmware on all of the GPUs at once.

Figure 2:
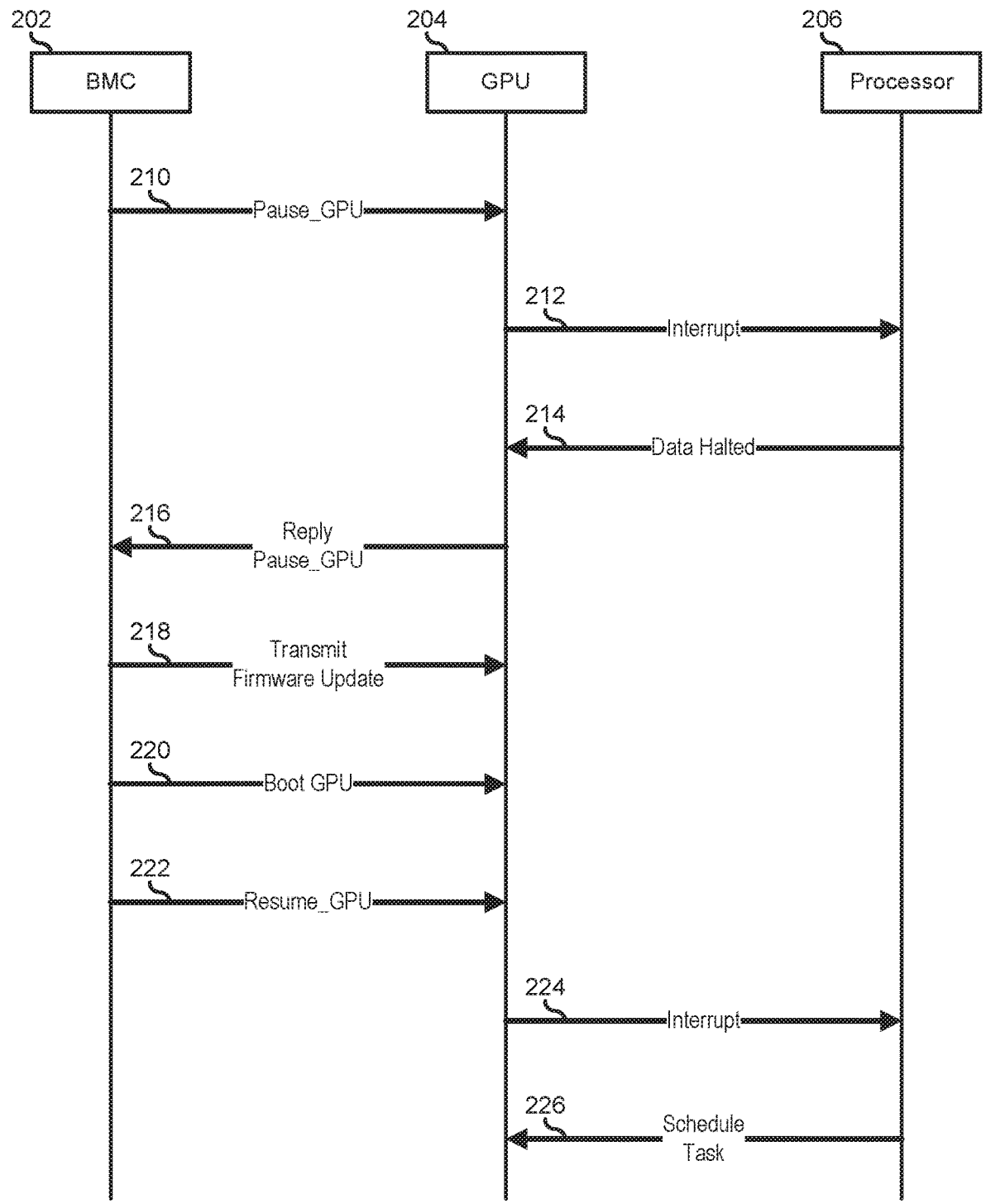
FIG. 2 illustrates a method for graphics processing unit management firmware updates according to an embodiment of the present disclosure.

FIG. 2 illustrates a method for graphics processing unit management firmware updates between a BMC 202, a GPU 204, and a processor 206. Starting at step 210, BMC 202 issues a command to pause GPU 204 (Pause_GPU). For example, BMC 150 can operate to send the command to GPU 110 via I3C interface 116, or the BMC can send the command to the GPU via interface 154 to processor 106 and to the GPU via the high-speed interface 108. Here, it will be understood that BMC 150 may communicate with GPU 110 via, for example, a PCIe switch that bypasses processor 106, thereby avoiding the problem of utilizing processor bandwidth to enable the firmware method as described herein. As such, it will be understood that other interactions of the present method, as described below, may be performed via an I3C interface or via interactions with a high-speed interface between the BMC and the target GPU.

In step 212, GPU 204 issues an interrupt to processor 206. The interrupt indicates that GPU 204 needs to halt processing on tasks in order to be serviced by BMC 202 to have the GPUs firmware updated. As such, the interrupt can be a software interrupt that is provided to a GPU driver, or may be a hardware interrupt that is provided to processor 206, as needed or desired. In step 214, processor 206 services the interrupt and operates to halt new tasks from being scheduled to GPU 204. Here, the scheduling of tasks to GPU 204 may be performed by the GPU driver, by a BIOS/UEFI, by an operating system or hypervisor, or by another agent, as needed or desired.

In step 216, GPU 204 provides a reply to the Pause_GPU command to BMC 202. In response, BMC 202 transmits the firmware update to GPU 204. Here, as noted above, the firmware update may be transmitted via an I3C interface or via a high-speed interface, as needed or desired. BMC 202 then operates to direct GPU 204 to reboot in step 220. In this way, GPU 204 has its firmware updated without having to reboot the entire system. After GPU 204 is rebooted, BMC 202 sends a command to GPU 204 to resume processing tasks (Resume_GPU) in step 222. In response to the Resume_GPU command, GPU 204 issues an interrupt to processor 206 that it can accept new processing tasks in step 224, and the processor schedules tasks to the GPU in step 226.

In a particular embodiment, a BMC, such as BMC 150 or 202, utilizes a Platform Level Data Model (PLDM) Monitoring and Control Specification to define messages and data structures for discovering, describing, initializing, accessing, and updating firmware in a GPU, such as GPU 110, 120, 130, 140, or 204, rebooting only the relevant GPU and without having to reboot the entire information handling system or host processing system. In a particular embodiment, the BMC operates to utilize the high-speed interface directly to the GPU without having to utilize the resources of the processor.

In another embodiment, a vendor-specific interface is provided between the GPUs of an information handling system. For example, where FIG. 1 illustrates high-speed interface 108 as being connected to processor 106, in the present case, GPUs 110, 120, 130, and 140 can also include one or more high-speed interfaces that are connected between the GPUs. For example, the vendor specific interfaces may represent one or more point-to-point high-speed data communication interfaces that are provided in accordance with a particular vendor's own internal specification, and that are used to provide dedicated data communications between the GPUs. An example of a vendor specific interface includes a communication interface in accordance with an NVLink protocol developed by Nvidia, or another vendor specific interface, as needed or desired. In a typical topology, a particular GPU may include six (6) separate vendor specific interface links that can be configured in various clustering topologies, as needed or desired. As such, information handling system 100 is illustrative, and is not meant to provide details as to any particular topology, and the details of providing clustered topologies is known in the art and will not be further disclosed herein except as needed to describe the present embodiments.

In this embodiment, the BMC operates to provide an updated firmware image to a first GPU as described above. Then, for updates to additional GPUs in the information handling system, the firmware image is transferred from the first GPU to the additional GPUs via the vendor specific interface, rather than from the BMC via the I3C interface or other system-wide high-speed interfaces. Then, the other GPUs which received the image from the original GPU operate to verify the firmware image utilizing a checksum, by checking one or more blocks of the received firmware image against the associated blocks in the senders firmware image, or by other verification means, and alerts the BMC if the firmware image is corrupted.

Figure 3:
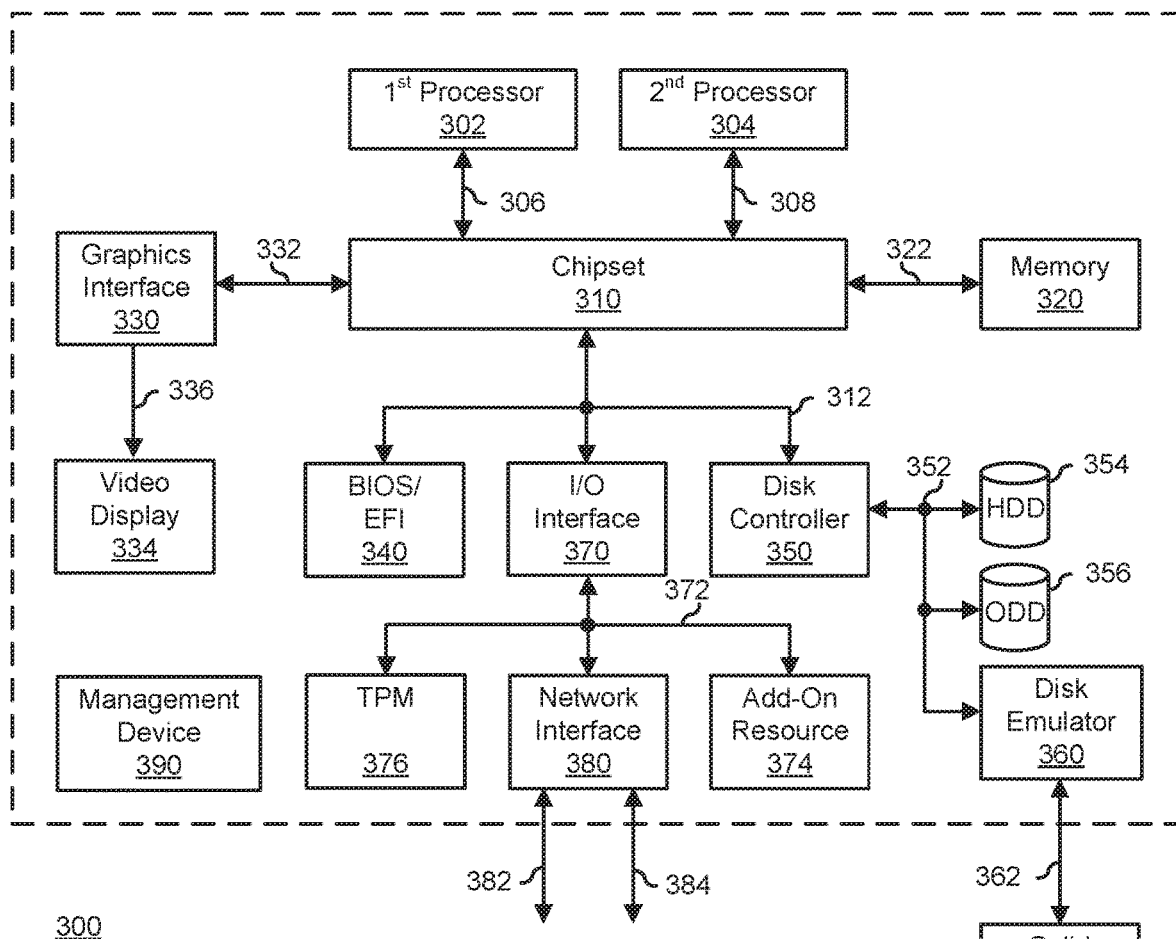
FIG. 3 is a block diagram illustrating an information handling system according to another embodiment of the present disclosure.

FIG. 3 illustrates a generalized embodiment of an information handling system 300 similar to information handling system 100. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below, and operates to perform one or more of the methods described below. Information handling system 300 includes a processors 302 and 304, a chipset 310, a memory 320, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 362, an input/output (I/O) interface 370, one or more add-on resources 374, a trusted platform module (TPM) 376, a network interface 380, a management device 390, and a power supply 395. Processors 302 and 304, chipset 310, memory 320, graphics interface 330, BIOS/UEFI module 340, disk controller 350, HDD 354, ODD 356, disk emulator 360, SSD 362, I/O interface 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to chipset 310 via processor interface 306, and processor 304 is connected to the chipset via processor interface 308. Memory 320 is connected to chipset 310 via a memory bus 322. Graphics interface 330 is connected to chipset 310 via a graphics interface 332, and provides a video display output 336 to a video display 334. In a particular embodiment, information handling system 300 includes separate memories that are dedicated to each of processors 302 and 304 via separate memory interfaces. An example of memory 320 includes random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O interface 370 are connected to chipset 310 via an I/O channel 312. An example of I/O channel 312 includes a Peripheral Component Interconnect (PCI) interface, a PCI-Extended (PCI-X) interface, a high speed PCI-Express (PCIe) interface, another industry standard or proprietary communication interface, or a combination thereof. Chipset 310 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O interface 370 includes a peripheral interface 372 that connects the I/O interface to add-on resource 374, to TPM 376, and to network interface 380. Peripheral interface 372 can be the same type of interface as I/O channel 312, or can be a different type of interface. As such, I/O interface 370 extends the capacity of I/O channel 312 when peripheral interface 372 and the I/O channel are of the same type, and the I/O interface translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as chipset 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300. Management device 390 can operate off of a separate power plane from the components of the host environment so that the management device receives power to manage information handling system 300 when the information handling system is otherwise shut down. An example of management device 390 may include a commercially available BMC product that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include a Integrated Dell Remote Access Controller (iDRAC), or the like. Management device 390 may further include associated memory devices, logic devices, security devices, or the like, as needed or desired.

Power supply 395 represents one or more devices for power distribution to the components of information handling system 300. In particular, power supply 395 can include a main power supply that receives power from an input power source, such as a wall power outlet, a power strip, a battery, or another power source, as needed or desired. Here, power source 395 operates to convert the power at a first voltage level from the input power source to one or more power rails that are utilized by the components of information handling system. Power supply 395 can also include one or more voltage regulators (VRs) that each receive power from the main power supply and that operate to convert the input voltage to an output voltage that is used by one or more components of information handling system. For example, a VR can be provided for each of processors 302 and 304, and another VR can be provided for memory 320. Power supply 395 can be configured to provide a first power plane that provides power to the host environment, and to provide a second power plane that provides power to the management environment.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a processor;
   a first graphics processing unit (GPU) including an interrupt interface coupled to the processor, and a low-speed interface; and
   a baseboard management controller (BMC) coupled to the low-speed interface;
   wherein the first GPU is configured to receive a first command from the BMC via the low-speed interface to halt processing data, to send a first interrupt to the processor via the interrupt interface in response to receiving the first command from the BMC, to determine that the processor has halted sending data to the first GPU in response to sending the first interrupt to the processor, and to send a first reply to the first command from the BMC in response to determining that the processor has halted sending data; and wherein the BMC is configured to, prior to rebooting the first GPU, send a firmware update to the first GPU in response to receiving the first reply from the first GPU and reboot the first GPU without rebooting the processor in response to receiving the first reply from the first GPU.

2. The information handling system of claim 1, wherein the processor is further configured to execute the first interrupt to halt data flow to the first GPU.

3. The information handling system of claim 1, wherein the BMC is further configured to send a second command to the first GPU to resume processing data in response to rebooting the first GPU.

4. The information handling system of claim 3, wherein the first GPU is further configured to send a second interrupt to the processor in response to receiving the second command from the BMC.

5. The information handling system of claim 4, wherein the processor is further configured to execute the second interrupt to resume data flow to the first GPU.

6. The information handling system of claim 1, wherein:
the first GPU further includes a high-speed interface;
the information handling system further comprises a second GPU coupled to the high-speed interface and to the low-speed interface; and
the first GPU is further configured to send the firmware update to the second GPU via the high-speed interface.

7. The information handling system of claim 6, wherein:
the second GPU is further configured to receive a second command from the BMC via the low-speed interface to halt processing data, to send a third interrupt to the processor via the interrupt interface in response to receiving the second command from the BMC, to determine that the processor has halted sending data to the second GPU in response to sending the third interrupt to the processor, and to send a second reply to the second command from the BMC in response to determining that the processor has halted sending data; and
the BMC is further configured to reboot the second GPU without rebooting the processor in response to receiving the second reply from the second GPU.

8. The information handling system of claim 1, wherein the low-speed interface comprises an I3C bus.

9. A method, comprising:
coupling a first graphics processing unit (GPU) of an information handling system to a processor of the information handling system via an interrupt interface;
coupling the first GPU to a baseboard management controller (BMC) of the information handling system via a low-speed interface;
receiving, by the first GPU, a first command from the BMC via the low-speed interface to halt processing data;
sending, by the first GPU, a first interrupt to the processor via the interrupt interface in response to receiving the first command from the BMC;
determining, by the first GPU, that the processor has halted sending data to the first GPU in response to sending the first interrupt to the processor;
sending, by the first GPU, a first reply to the first command from the BMC in response to determining that the processor has halted sending data;

prior to rebooting the first GPU, sending, by the BMC, a firmware update to the first GPU in response to receiving the first reply from the first GPU; and
rebooting, by the BMC, the first GPU without rebooting the processor in response to receiving the first reply from the first GPU.

10. The method of claim 9, further comprising:
executing, by the processor, interrupt code to halt data flow to the first GPU in response to sending the first interrupt to the processor.

11. The method of claim 9, further comprising:
sending, by the BMC, a second command to the GPU to resume processing data in response to rebooting the first GPU.

12. The method of claim 11, further comprising:
sending, by the first GPU, a second interrupt to the processor in response to receiving the second command from the BMC.

13. The method of claim 12, further comprising:
executing, by the processor, interrupt code to resume data flow to the first GPU in response to sending the second interrupt to the processor.

14. The method of claim 9, wherein:
coupling a second GPU to the first GPU via a high-speed interface; and
sending, by the first GPU, the firmware update to the second GPU via the high-speed interface.

15. The method of claim 14, further comprising:
receiving, by the second GPU, a second command from the BMC via the low-speed interface to halt processing data;
sending, by the second GPU, a third interrupt to the processor via the interrupt interface in response to receiving the second command from the BMC;
determining, by the second GPU, that the processor has halted sending data to the second GPU in response to sending the third interrupt to the processor;
sending, by the second GPU, a second reply to the second command from the BMC in response to determining that the processor has halted sending data; and
rebooting, by the BMC, the second GPU without rebooting the processor in response to receiving the second reply from the first GPU.

16. The method of claim 9, wherein the low-speed interface comprises an I3C bus.

17. An information handling system, comprising:
a graphics processing unit (GPU) including a low-speed interface; and
a baseboard management controller (BMC) coupled to the low-speed interface;
wherein the GPU is configured to receive a command from the BMC via the low-speed interface to halt processing data, to send an interrupt via an interrupt interface in response to receiving the command from the BMC, to determine that the GPU has stopped receiving data in response to sending the interrupt, and to send a reply to the command from the BMC in response to determining that the GPU has stopped receiving the data; and
wherein the BMC is configured to, prior to rebooting the GPU, send a firmware update to the GPU in response to receiving the reply from the GPU and reboot the GPU in response to receiving the reply from the GPU.

* * * * *